March 21, 1944.   A. F. GROLL   2,344,508
MEASURING DEVICE
Filed May 30, 1942   3 Sheets-Sheet 1

INVENTOR.
ALVIN F. GROLL
BY *Fay, Macklin, Gohrich, Williams, Shilton and Isler*
ATTORNEYS

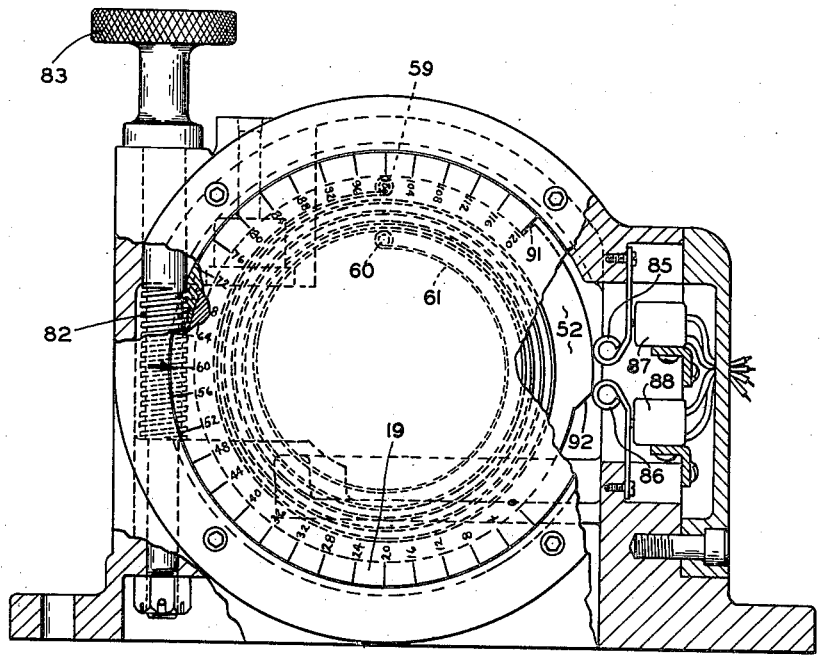

March 21, 1944. A. F. GROLL 2,344,508
MEASURING DEVICE
Filed May 30, 1942 3 Sheets-Sheet 3

INVENTOR.
ALVIN F. GROLL.
BY
ATTORNEYS.

Patented Mar. 21, 1944

2,344,508

UNITED STATES PATENT OFFICE 2,344,508

MEASURING DEVICE

Alvin F. Groll, Cleveland, Ohio, assignor to E. W. Bliss Company, Brooklyn, N. Y., a corporation of Delaware Application May 30, 1942, Serial No. 445,170

7 Claims. (Cl. 33—132)

The present invention relates to the feeding of sheets of steel or the like to an operating mechanism and particularly to a device by which the length of sheet fed is controlled and measured.

Sheet feeding devices should be as accurate as it is possible to make them in order that the length of sheet fed may be closely controlled. This is especially true where large numbers of sheets are fed and where it is desired to keep the amount of scrap down to a minimum. Furthermore, in feeding sheets, as steel, to dies, it is necessary that the length of stock fed be maintained within close limits to a predetermined figure in order that the drawing or forming operation may be of uniform accuracy in the case of each part made. Devices of the nature indicated above are normally used in feeding strip stock of varying widths and lengths to a forming machine, such as a drawing press. In many cases the strip or sheet is fed from a coil and a predetermined length of the coil is fed to the machine for each cycle of operation.

Devices of this character have heretofore been built to directly operate an indicating member through motion obtained from the traveling sheet. Among other disadvantages with such devices the surface characteristics of the sheet and any roller engaging the same occasioned some slippage with a consequent variation in movement transmitted from the moving sheet to operate the indicator.

The general object of the present invention has been to provide an indicating device which is driven by a power means independently of the moving sheet. In the present invention the travel of the sheet itself is employed to gauge the amount the indicator may be moved by its independent actuating means. In other words, the sheet movement is employed as a control rather than a driving force.

A further object of the present invention has been the construction of an indicating device in which the indicator member is set once at the beginning of the operation for feeding definite lengths of strip successively without the necessity of resetting the indicator member after each sheet is fed. The actual measuring of the sheet is done by a cam which is set by an indicator member and driven in synchronism with the sheet feeding, which cam is returned automatically to the starting point after each length is fed.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principles of the invention may be used.

In said annexed drawings—

Fig. 2 shows the indicator and measuring device on an enlarged scale;

Fig. 3 is a similar view of the device in a different position of the measuring cam;

Figure 1:
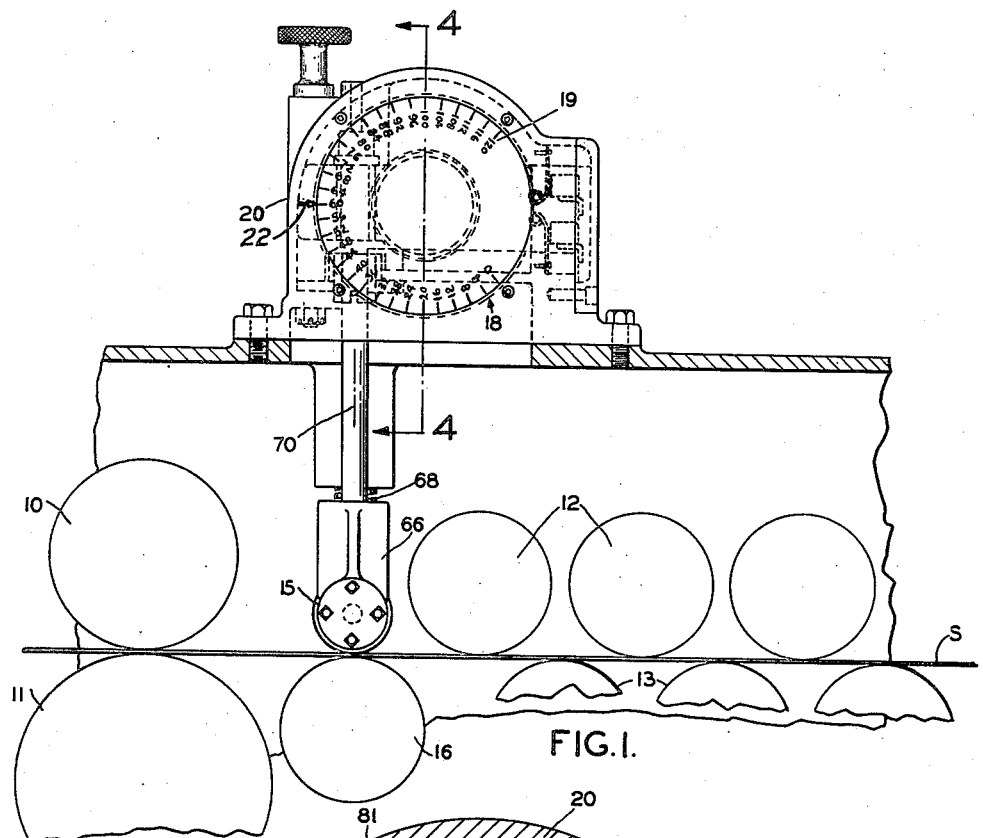
Fig. 1 is a schematic view of my improved indicator device mounted in connection with sheet feeding rolls.

Referring now to Fig. 1, the invention is used with a conventional feeding mechanism employing a pair of pinch feeding rolls 10 and 11 and a series of straightening rolls 12 and 13 working on a sheet S. A roll 15, forming an operative part of the indicating device as hereafter described, is resiliently urged against a backing roll 16.

The length of the stock fed during each operative cycle of the device is registered and controlled by an indicator member 18 including a graduated dial 19. This dial, as shown in Fig. 1, is calibrated in inches and by registration of the number of inches desired to be fed, indicated by an arrow 22, with a zero point, there is maintained an accurate reading of the sheet length.

Figures 4, 5:
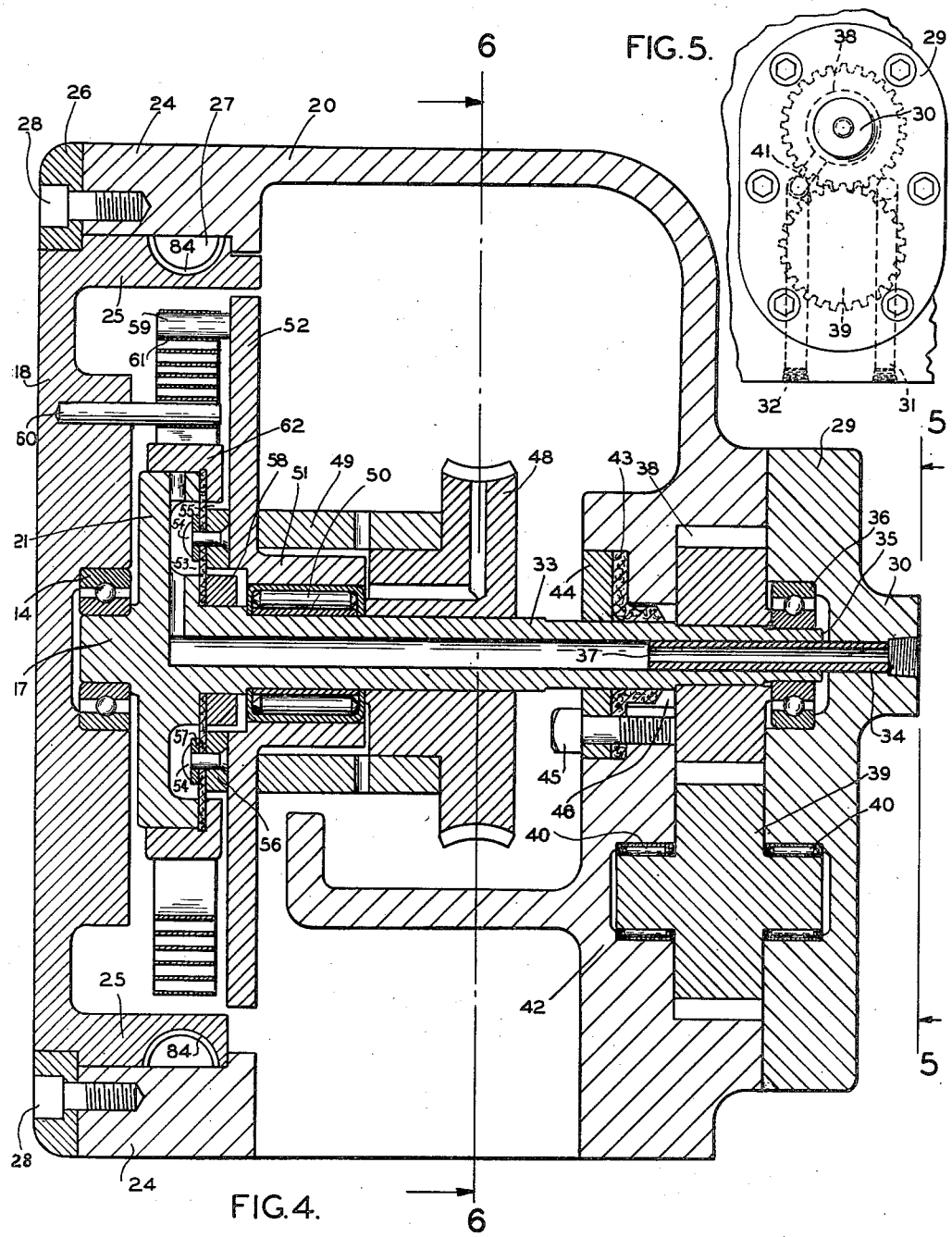
Fig. 4 is an enlarged section through Fig. 1 as indicated by the lines 4—4 thereon.
Fig. 5 is an end view of the device as indicated by lines 5—5 on Fig. 4; the view being on a reduced scale.

As shown in Fig. 4 the indicator member 18 is mounted for rotation on a ball bearing 14, the inner races of which are supported by a boss 17 of a flanged plate 21, that is integrally formed with a central shaft 33 extending through the width of a housing 20. This housing also serves to enclose the driving and control mechanisms to be described below.

For receiving the indicator member 18 the housing is formed with an enlarged rim portion 24, into which a flanged portion 25 of member 18 is fitted with a slight clearance that will allow slow rotation. A ring 26, engaging a shoulder of indicator 18, holds the latter against rim 24 to which it is secured by means of bolts 28.

Housing 20 is closed at the rear end by an oval shaped cover plate 29 with a circular boss 30 in the upper part adapted to receive the end of a tube 34. This tube extends into the interior of the hollow shaft 33 forming a continuous oil passage therewith. Shaft 33 is journalled at its righthand end 35 in a ball bearing 36, whose outer races are supported by the cover plate 29. Adjacent the end portion 35 of shaft 33 a stepped portion 37 of said shaft has mounted thereon a gear 38 which meshes with another gear 39 journalled at one side in needle bearings 40 housed within the lower portion of plate 29 and on the other side in the rear wall 42 of housing 20. The two gears form the driving elements proper and are actuated by oil under pressure. This gear drive is more fully shown in Fig. 5. 31 indicates the intake, 32 the outlet of a pipe system through which oil under pressure is flowing, driving the gears 38, 39 while it is forced through between them. This device is the reverse of a gear pump. A branch pipe 41 admits oil from the system to the ball bearing 36 for the purpose of preventing pressure from building up in the chamber behind the bearing. A packing 43 (Fig. 4), held by a capping plate 44 and bolt 45, seals the gear 38 and confines the oil in a chamber 46.

In the center of the housing a worm wheel 48 is mounted on shaft 33, which wheel forms the connection between the drive for a cam 52 forming part of the measuring device and the mechanism actuated by the feed of sheets between rolls 15 and 16.

The left-hand side of shaft 33 carries a needle bearing 50 on which cam 52 having the hub 51 is mounted. This cam serves as the measuring member proper which actuates two switches controlling the feed of the sheet, as will be later described.

A sleeve 49 is provided for spacing cam 52 from worm wheel 48. For moving this cam pressure is built up in an oil chamber 53 adjacent thereto, which is formed in the flanged plate 21 of shaft 33 and which, through the before mentioned passage in the interior of said shaft and the connecting tube 34 is in communication with an oil tank; on the other side the chamber 53 is closed by a diaphragm 55. This diaphragm is held in place by annular members 58 and 62 which clamp the diaphragm against plate 21. An annulus 56 of friction material is interposed between the diaphragm and cam 52 for driving the latter. The annulus is fastened by means of rivets 54 over riveting plates 57.

Cam 52 is designed to be returned after each cycle to the starting position with respect to indicator member 18. Such return is accomplished by means of a spiral spring 61 one end of which is fastened to cam 52 by means of a stud 59, and whose other end is fastened to indicator member 18 by means of a pin 60 (see also Figs. 2 and 3).

Fig. 2 shows the setting mechanism for the indicator member at the left-hand side of the drawings, where a part of the dial 19 is shown broken away. The mechanism consists of a worm 82 rotated by a set screw 83. The worm engages the teeth 84 which are formed in indicator member 18, thereby allowing it to be driven through the desired angle which in turn determines the length of sheet S fed. Indicator member 18 carries on its under side a stop 90, shown in Fig. 3 in dotted lines between figures 52 and 60 on the dial 19. Cam 52 has a shoulder 91 which abuts on this stop when the indicator device is set for the start of a feeding operation. The end of the camming portion is designated by 92. In the path of this portion there are two contacts 85 and 86 of two limit switches 87 and 88.

In Fig. 3 the indicating device is shown at the time it is set to start the feed of a certain length of sheet. In the particular example there shown the feed length is 60 inches. During the feeding of sheet S between rolls 15 and 16 the cam moves in the direction of the arrow in Fig. 3.

The actual rotation of the feeding rolls, such as 10 and 11, is effected electrically and is controlled through the position of the two limit switches 87, 88 just described. As the cam 52 moves clockwise its camming portion 92 first strikes the arm 85 which contacts switch 87 and from there through suitable electrical apparatus slows down the rate of travel of the sheet to be fed. As the cam portion 92 engages the arm 86 the latter limit switch 88 associated therewith operates to stop the rotation of the feeding rolls.

It will thus be seen that the sheet feeding is stopped in two increments. First, it is slowed down from a high speed feed to a slow speed feed and finally it is stopped entirely. This gradual deceleration is an effective means in the prevention of overfeeding the sheet.

Figure 6:
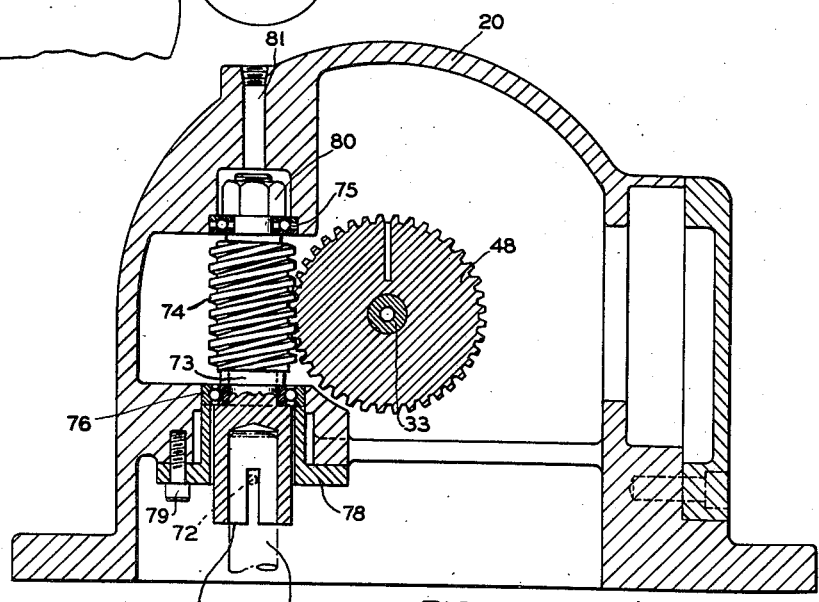
Fig. 6 is a sectional view taken along lines 6—6 of Fig. 4.

As stated before, the movement of sheets fed through rollers 15 and 16 is used to control the measuring member and the mechanism which is provided for this purpose will now be described with reference to Figs. 1 and 6.

The sheet engaging roller 15 is carried in bearings (not shown) mounted in a subframe 66 and urged down into engagement with the moving sheet by spring 68. By means of a transmission, not shown in the drawings, the roll 15 acts on a vertical shaft 70, that at its top end is received in a socket 71 to which it is keyed at 72. Socket 71 is integrally formed with a shaft 73 of a worm 74 mounted for engagement with worm wheel 48. Shaft 73 is supported by ball bearings 75 and 76 which are carried by the housing 20. A bearing retainer 78 serves to hold bearing 76 and is secured to the housing by bolt 79, whereas bearing 75 is fastened by a nut 80. An oil intake 81 is provided for lubricating purposes, having a threaded opening for attachment of some lubricating device.

The operation of the indicating and measuring device is as follows: As already mentioned, there is a separate driving force, namely gear motor 38, 39, for the indicating device, whereas the wormwheel 48, drivingly connected to the sheet S on the one hand and to shaft 33 on the other hand, merely serves the function of controlling the rotation imparted by said gear motor.

As soon as the indicating member 18 has been set as shown in Fig. 3, the mechanism is ready for operation. This involves starting the electric motor for sheet feeding action and simultaneously starting the gear motor for rotation of cam 52 from shaft 30. At this same time a pressure device applies pressure in tube 34. The timing of these three mechanisms is brought about by standard electrical controls, not shown in the drawings, but understood by anyone skilled in the art. The energization of the electric motor will start the feeding of sheet S through rollers 10 and 11 to roll 15. This roll will drive member 70 and worm 74, and wormwheel 48 is caused to move and control the rotation of shaft 33, which is brought about by gear motor 38, 39. Owing to the pressure simultaneously applied through tube 34 diaphragm 55 will frictionally engage cam 52 interconnecting said cam with the shaft 33 and causing the cam to start rotating in clockwise direction, tensioning spring 61 as it moves on.

As the cam portion 92 arrives at the first contact arm 85 limit switch 87 is actuated to slow down the feed movement, which is completely stopped by switch 88. At the same time pressure on the diaphragm is released through tube 34 and the gear motor driving shaft 33 is stopped likewise. Cam 52 is returned by action of spring 61 to the starting position and the cycle of movements is repeated as described above.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A measuring device for sheet metal comprising combined indicator and measuring means adapted to be set at the beginning of a series of operations and to be returned to starting position automatically after each individual operation, means independent of the sheet feeding drive for rotating said measuring means, a rotatable member for transmitting the drive from said independent driving means to said measuring means, and a means mounted on said rotatable member and being adapted to engage an element forming a connection with and being driven by the sheets fed through the device whereby said last mentioned means is enabled to control the rotation of said measuring means.

2. A measuring device for sheet metal comprising combined indicator and measuring means adapted to be set at the beginning of a series of operations and to be returned to starting position automatically after each individual operation, means independent of the sheet feeding drive, and comprising a fluid operated gear motor, for rotating said measuring means, a rotatable member for transmitting the drive from said gear motor to said measuring means, and a means mounted on said rotatable member and being adapted for engagement with an element forming a connection with and being driven by the sheets fed through the device whereby said last mentioned means is enabled to control the rotation of said measuring means.

3. A measuring device for sheet metal comprising combined indicator and measuring means adapted to be set at the beginning of a series of operations and to be returned to starting position automatically after each individual operation, a dial, a cam adapted to move through a cycle and thereby control the length of a sheet fed, a spring mounted both on said dial and said cam for yieldingly connecting the same and returning the cam to its starting position, means independent of the sheet feeding drive, and comprising a fluid operated gear motor, for rotating said cam, a rotatable member for transmitting the drive from said gear motor to said cam, and a means mounted on said rotatable member and being capable to engage with an element forming a connection with and being driven by the sheets fed through the device whereby said last mentioned means is enabled to control the rotation of said cam of said measuring means.

4. A measuring device for sheet metal comprising combined indicator and measuring means adapted to be set at the beginning of a series of operations and to be returned into starting position automatically after each individual operation, a dial, a cam adapted to move through a cycle and thereby control the length of a sheet fed, a spring mounted both on said dial and said cam for yieldingly connecting the same and returning the cam to its starting position, means independent of the sheet feeding drive for rotating said cam means, a rotatable member for transmitting the drive from said rotating means, and a means mounted on said rotatable member and being capable to engage with an element forming a connection with and being driven by the sheets fed through the device whereby said last mentioned means is enabled to control the rotation of said cam of said measuring means.

5. A measuring device for sheet metal comprising combined indicator and measuring means adapted to be set at the beginning of a series of operations and to be returned into starting position automatically after each individual operation, means independent of the sheet feeding drive, and comprising a fluid operated gear motor for rotating said measuring means, a rotatable shaft for transmitting the drive from said gear motor to said measuring means, and a worm wheel mounted on said shaft and being capable to engage with a worm forming part of a connection with and being driven by the sheets fed through the device whereby said last mentioned means is enabled to control the rotation of said measuring means.

6. In a measuring device for sheet material, a dial, a measuring cam yieldingly connected to said dial, mechanism for driving said cam comprising an intermittently working gear motor, fluid means for actuating said gear motor, means for intermittently engaging and disengaging said measuring cam in timed relation with said gear motor, a driving connection comprising a worm and a wormwheel mounted to be driven by a sheet being fed and capable of controlling the amount of rotation of said measuring cam.

7. In a measuring device for sheet material, a dial, a cam adapted to move through a cycle and thereby control the length of sheet fed, a spring for yieldingly connecting said cam to said dial, mechanism for driving said cam comprising an intermittently working gear motor, fluid means for actuating said gear motor, a fluid operated diaphragm for intermittently engaging and disengaging said cam in timed relation with said gear motor, a driving connection comprising a worm and a wormwheel mounted to be driven by said sheet being fed and capable of controlling the amount of rotation of said measuring cam.

ALVIN F. GROLL.